United States Patent [19]
Shichijyo

[11] Patent Number: 5,943,350
[45] Date of Patent: Aug. 24, 1999

[54] LASER LIGHT GENERATING APPARATUS

[75] Inventor: Shiro Shichijyo, Sodegaura, Japan

[73] Assignee: Mitsui Chemicals, Inc., Tokyo, Japan

[21] Appl. No.: 08/869,772

[22] Filed: Jun. 5, 1997

[30]     Foreign Application Priority Data

Jun. 5, 1996  [JP]  Japan .................................... 8-142810

[51] Int. Cl.$^6$ ....................................................... H01S 3/10
[52] U.S. Cl. .............................. 372/21; 372/93; 372/94; 372/99
[58] Field of Search ................................. 372/19, 21, 22, 372/93, 94, 99, 95

[56]                References Cited

U.S. PATENT DOCUMENTS

| | | | |
|---|---|---|---|
| 5,052,815 | 10/1991 | Nightingale et al. | 372/94 |
| 5,136,597 | 8/1992 | Nightingale | 372/21 |
| 5,652,757 | 7/1997 | Okazaki et al. | 372/21 |

OTHER PUBLICATIONS

Yoichi Taira, Applied Physics, vol. 61, No. 9, p. 931, "Efficiency intracavity Frequency Doubling of CW Ion Lasers", Jun. 15, 1992.

*Primary Examiner*—Hemang Sanghavi
*Attorney, Agent, or Firm*—Birch, Stewart Kolasch & Birch, LLP

[57]                ABSTRACT

An object of the invention is to provide a laser light generating apparatus capable of minimizing loss in a resonator to give a high efficiency of wavelength conversion. A resonator comprises two reflecting mirrors 1 and 2 arranged in linear relationship and a non-linear optical crystal 3 disposed in the resonator. The non-linear optical crystal 3 is formed in a trapezoid shape so that a pair of input and output sides opposite to each other are tilted with respect to the optical propagation axis. The fundamental laser light is introduced along the optical propagation axis into the optical resonator, converted to a second harmonic by the non-linear crystal 3, and released outside from the reflecting mirror 2. It is made possible to adjust the beam diameter and convergence angle of the laser light on the light incidence plane (Y–Z plane) when the laser light passes the input and output sides of the non-linear optical crystal 3. For example, the incident plane is made to be consistent with a plane where the acceptance angle of the non-linear optical crystal 3 is limited to a small degree, thus increasing the efficiency of wavelength conversion.

10 Claims, 8 Drawing Sheets

LASER LIGHT GENERATING APPARATUS

BACKGROUND OF THE INVENTION

1. Field of the Invention

The present invention relates to a laser light generating apparatus for generating laser light having a wavelength converted by a non-linear optical crystal by introducing fundamental laser light from the outside to an optical resonator or generating fundamental laser light within the optical resonator.

2. Description of the Related Art

Since the power density of laser light inside an optical resonator is high, effective conversion in wavelength is expected. Among such known optical resonators for a laser light generating apparatus are an external resonance type second harmonic generator (SHG) and an internal resonance type SHG.

The internal resonance type SHG has such a structure that a laser medium and a non-linear optical crystal are arranged in one optical resonator, and effective conversion in wavelength can be realized by satisfying phase matching conditions between fundamental laser light generated by the laser medium and second harmonic laser light converted by the non-linear optical crystal.

The external resonance type SHG has such a structure that a non-linear optical crystal is arranged in a second optical resonator which is separated from a laser resonator for generating fundamental laser light, and the conversion in wavelength to the second harmonic is carried out by resonance of the fundamental laser light in the second optical resonator.

In such external resonance type SHG, the power density in the optical resonator can be is increased by some hundreds times the power density of incident light by setting the fines value (Q value) representing the sharpness of resonance of the optical resonator to a large value such as 10 to 1000, hence increasing the efficiency of conversion in wavelength by the non-linear optical crystal in the optical resonator.

Figure 8A:
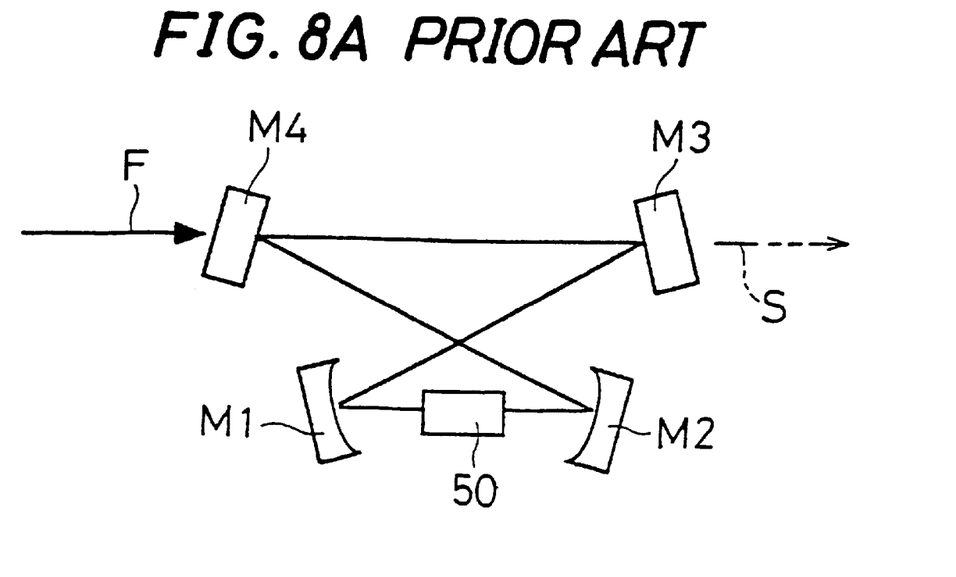
FIGS. 8A and 8B illustrate a configuration of a conventional laser light generating apparatus in an external resonance type SHG, FIG. 8A relating to a Z-ring resonator and FIG. 8B relating to a triangle-ring resonator.
Figure 8B:
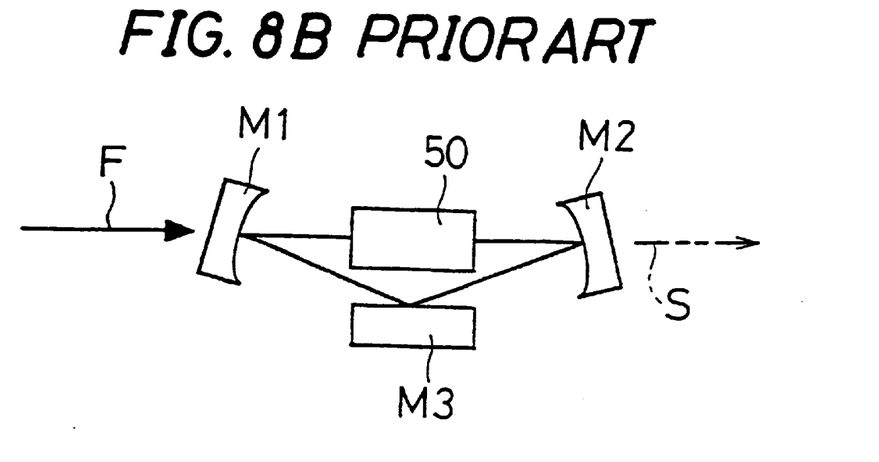

FIGS. 8A and 8B are configuration views of external resonance type SHGs. More particularly, FIG. 8A shows an example in which a Z-ring optical resonator is used and FIG. 8B is an example in which a triangle-ring optical resonator is used. Referring to FIG. 8A, the optical resonator has four reflecting mirrors M1 to M4 arranged in a so-called bow-tie pattern where the optical axes of the resonator cross each other, and a non-linear optical crystal 50 is displaced between the two reflecting mirrors M1 and M2. Fundamental laser light F emitted from an external laser apparatus is introduced through the reflecting mirror M4 to the interior of the optical resonator to resonate. After passing the non-linear optical crystal 50, the fundamental laser light is converted to a second harmonic, reflected by the two reflecting mirrors M2 and M3, and released out from the reflecting mirror M3 as second harmonic laser light S.

Referring to FIG. 8B, the optical resonator has such a structure that three reflecting mirrors M1 to M3 are arranged so that the optical axes of the optical resonator forms a triangle, and a non-linear optical crystal 50 is displaced between the two reflecting mirrors M1 and M2. Fundamental laser light F emitted from an external laser apparatus is introduced through the reflecting mirror M1 to the interior of the optical resonator to resonate. After passing the non-linear optical crystal 50, the fundamental laser light F is converted to the second harmonic, and released outside from the reflecting mirror M2 as the second harmonic laser light S.

In this manner for increasing the fines value of the optical resonator, it is preferable to minimize the number of the reflecting mirrors to restrain loss of the laser light in the reflecting mirrors as small as possible. The reflecting mirror M3 shown in FIG. 8B tends to decrease the reflection coefficient of incident light due to a large incident angle of the incident light, with the result that the fines value of the optical resonator is decreased. In particular, in the case of generating a harmonic of the ultraviolet spectrum, since the non-linear constant of the non-linear optical crystal 50 is decreased, thus decreasing the efficiency of wavelength conversion. Hence, the ring-type resonator with higher fines value composed of four reflecting mirrors as shown in FIG. 8A is often used as the optical resonator for generating ultraviolet rays.

On the other hand, the efficiency of the wavelength conversion in the non-linear optical crystal is increased proportional to the power density of the fundamental laser light F. Accordingly the non-linear optical crystal 50 is thus displaced at a beam waist where the power density is maximum.

Additionally phase matching conditions in the non-linear optical crystal are important as well as a large acceptance angle depending on the phase matching conditions. The acceptance angle reaches a maximum when non-critical phase matching is established, i.e. the crystal axis of the non-linear optical crystal is consistent with the optical path of the laser light. It is ideal but is hardly feasible to locate the non-linear optical crystal so that such non-critical phase matching is achieved through assembling and adjusting pertinent components at higher accuracy. Commonly, a compromise of critical phase matching is employed in which the phase matching is established within a given angle from the crystal axis. Such critical phase matching is however unfavorable in the respect of allowance. Also, the allowance of phase matching will vary between two orthogonal directions of the optical path.

For example, there is not known such a non-linear optical crystal as to achieve non-critical phase matching in producing a second harmonic of the ultraviolet spectrum from its fundamental wave of a substantially 500 nm wavelength by wavelength conversion. Generally, beta-barium borate (BBO) crystal is used as the non-linear optical crystal for angular phase matching which is one of critical phase matching modes.

The angular phase matching is explained in more detail. When the fundamental wave is incident on a BBO crystal along the horizontal direction, phase matching is achieved with the c-axis of the BBO crystal extending on the horizontal plane. Two of the acceptance angles are provided on the vertical plane and on the horizontal plane where the optical path of the fundamental wave lies. Assuming that a second harmonic is produced from the fundamental wave of a 532 nm wavelength in type I of phase matching, the allowance (a product of the acceptance angle and the length of the crystal) in the φ direction from the c-axis of the BBO crystal is 0.6 (deg·cm) which is much greater than the allowance 0.016 (deg·cm) in the θ direction vertical to the φ direction. This causes the efficiency of wavelength conversion to be hardly increased even if the laser light is converged through a greater angle than the acceptance angle in the θ direction. Hence, the laser light may be moderately converged in the θ direction so that its converging angle is smaller than the acceptance angle.

Figure 9A:
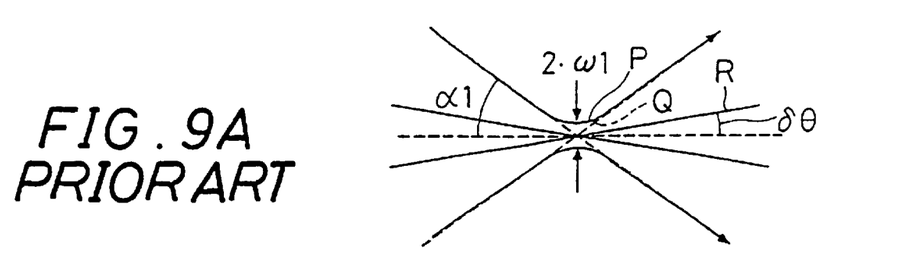
FIGS. 9A through 9D are explanatory views showing a convergence status of laser light, FIGS. 9A and 9B being cross sectional views of the θ plane and the φ plane, respectively in a certain convergence status, and FIGS. 9C and 9D being cross sectional views of the θ plane and the φ plane, respectively in another convergence status.
Figure 9B:
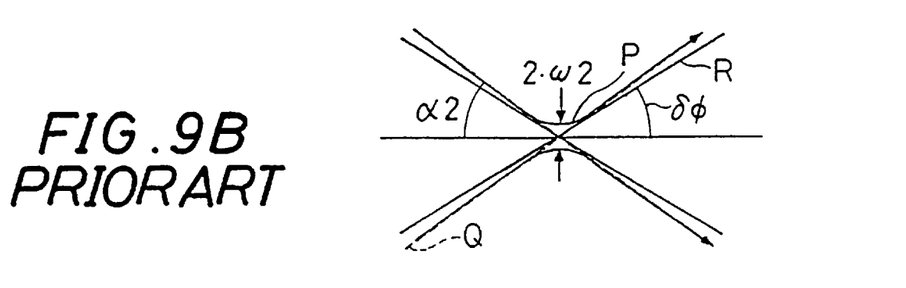
Figure 9C:
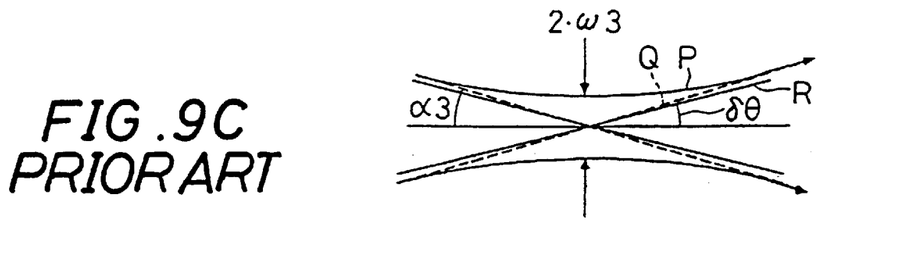
Figure 9D:
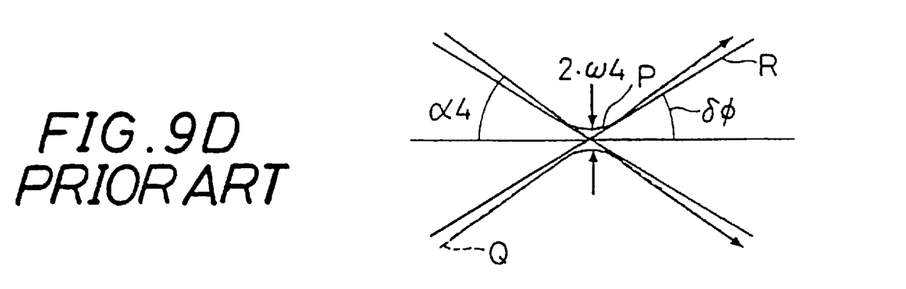

FIGS. 9A through 9D are views showing convergence patterns of the laser light. More specifically, FIGS. 9A and 9B are cross sectional views of θ plane and φ plane, respectively in one convergence pattern and FIGS. 9C and 9D are cross sectional views of θ plane and φ plane, respectively, in another convergence pattern. As shown in FIG. 9, a solid line P represents a profile of the location where the intensity of the laser light beam is decayed from its maximum to e $^{-2}$(e being a base of natural logarithm). Also, the broken line Q is an asymptonic line of the beam profile and the solid line R represents a range of the acceptance angle.

In case of Gaussian beam with the distribution of the light intensity representing normal distribution, there is a certain relationship between the converging angle and the diameter of a beam waist. Assuming that the converging angle or an open half angle between the center line and the asymptotic line is α, the diameter of the beam waist is ω, the wavelength of the laser light is λ, and the refractive index is n, the following equation is established.

$$\alpha = \lambda/(\pi \cdot \omega \cdot n) \quad (1)$$

It is common that an acceptance angle δθ in θ direction and an acceptance angle δφ in φ direction are different from each other on a c-axis of the non-linear optical crystal. In the case where the acceptance angle δφ is, for example, greater than the acceptance angle δθ (δφ>>δθ) as shown in FIGS. 9A and 9B, when axially symmetrical laser light is used, the converging angle α2 is substantially consistent with the acceptance angle δφ on the φ plane of FIG. 9B, so that effective wavelength conversion is achieved. However, since the converging angle α1 is much greater than the acceptance angle δθ on the θ plane of FIG. 9A, only a part of the laser light within the acceptance angle δθ contributes to the wavelength conversion. Accordingly, the far-field pattern of a resultant second harmonic released from the non-linear optical crystal is a narrow oval shape extending along the θ direction with the result of low efficiency of the wavelength conversion.

On the other hand, as shown in FIGS. 9C and 9D, when the beam waist diameter ω3 is set large by moderately converging the laser light so that the converging angle α3 in the θ direction is small, the converging angle α3 is substantially consistent with the acceptance angle δθ. As the result, the efficiency of the wavelength conversion will be maintained high in both the planes.

The laser light having such a profile as shown in FIGS. 9C and 9D is easily realized by converging intensively in one direction and moderately in another direction vertical to the direction. This allows the use of an optical converging system which comprises a combination of a spherical concave lens and a cylindrical lens ("Applied Physics", vol. 61, No. 9, p. 931, 1992)

Figure 10:
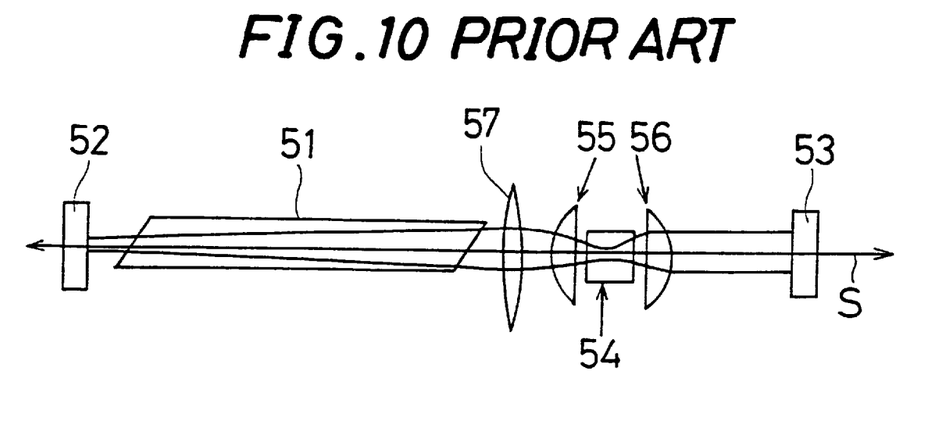
FIG. 10 is a configuration view of an example of a conventional laser light generating apparatus.

FIG. 10 is a configuration view of an example of a conventional laser light generating apparatus. This is disclosed in the above-mentioned reference, in which an optical resonator of argon ion laser is composed of a plasma tube 51 filled with argon ions and two reflecting mirrors 52 and 53. The optical resonator contains therein a non-linear optical crystal or BBO crystal 54 for wavelength conversion to produce second harmonic laser light S which is released outside from the reflecting mirror 53.

Furthermore, there are provided a spherical lens 57 and two cylindrical lenses 55 and 56 for controlling the convergence status of the laser light in the BBO crystal 54.

The spherical lens 57 has convergence power on two planes vertical to and parallel to the plane of a sheet of FIG. 10 and the cylindrical lenses 55 and 56 have convergence power only on the plane parallel to the sheet. Accordingly such a convergence status that the beam waist diameter and the converging angle of the laser light are different between the two planes orthogonal to each other is realized in the BBO crystal 54.

However, as shown in FIG. 10, the arrangement of optical parts such as a converging lens in the optical resonator invites an increase in the loss of the laser light, and as a result the fines value of the resonator remarkably decreases, resulting in reduction in wavelength conversion efficiency. On the other hand, if the acceptance angle of the non-linear optical crystal is different between the two planes orthogonal to each other, it is difficult to suitably maintain the convergence status of the laser light with no use of extra optical devices.

SUMMARY OF THE INVENTION

It is hence an object of the present invention to provide a laser light generating apparatus capable of minimizing loss in a resonator to give a high efficiency of the wavelength conversion.

The invention provides a laser light generating apparatus comprising an optical resonator having at least a pair of reflecting means and a non-linear optical crystal disposed in the optical resonator, the apparatus for introducing fundamental laser light to the optical resonator to cause a resonance action of the fundamental laser light to produce laser light whose wavelength is converted by the non-linear optical crystal, wherein the non-linear optical crystal has a pair of input and output sides which are arranged opposite to and not parallel to each other and also, tilted with respect to an optical propagation axis.

According to the invention, the input and output sides of the non-linear optical crystal are tilted with respect to the optical propagation axis, thus allowing convergence condition of the fundamental laser light in two directions orthogonal to each other in the non-linear optical crystal to be different. This ensures an optimum convergence of the laser light in the non-linear optical crystal without the use of extra optical devices in the optical resonator and will suppress the loss in the optical resonator. While the input and output sides of the non-linear optical crystal are arranged not parallel to each other, it is preferred that an angle between two cross lines of the input and output sides respectively taken along the plane including the optical propagation axis ranges from 10 degrees to 160 degrees.

The invention provides a laser light generating apparatus comprising an optical resonator having at least a pair of reflecting means and a combination of a non-linear optical crystal and a laser medium disposed in the optical resonator, the apparatus for introducing an exciting light for exciting the laser medium from outside to the optical resonator to generate a fundamental laser light in the optical resonator by the laser medium, and further generate laser light whose wavelength is converted by the non-linear optical crystal, wherein the non-linear optical crystal has a pair of input and output sides which are arranged opposite to and not parallel to each other and tilted with respect to the optical propagation axis.

According to the invention, such an internal resonance type construction is employed that the laser medium is placed in the optical resonator to generate the fundamental laser light in the optical resonator by the exciting light from an external semiconductor laser, so that the fundamental laser light is in turn subjected to the wavelength conversion. Accordingly a high conversion efficiency can be attained. Light outputted from the semiconductor laser is an example of the exciting light for exciting the laser medium.

In addition, each of the input and output sides of the non-linear optical crystal is tilted with respect to the optical propagation axis, thus allowing convergence conditions of the fundamental laser light in two directions orthogonal to each other on the non-linear optical crystal to be different to each other. This ensures an optimum convergence of the laser light on the non-linear optical crystal without the use of extra optical devices in the optical resonator and will suppress the loss in the optical resonator. While the input and output sides of the non-linear optical crystal are arranged not parallel to each other, it is preferred that an angle between two cross lines of the input and output sides respectively taken along the plane including the optical propagation axis ranges from 10 degrees to 160 degrees.

In the invention it is preferable that the fundamental laser light incident in the non-linear optical crystal is set so that a beam waist is formed to have an oval shaped cross section and that a plane including the incident direction of the fundamental laser light and the direction of the normal to the input and output sides of the non-linear optical crystal and a direction where the acceptance angle for phase matching in the non-linear optical crystal is small are substantially parallel.

This allows the angle of convergence of the fundamental laser light to be equal or smaller than the acceptance angle of the non-linear optical crystal and hence a large part of the fundamental laser light contributes to the wavelength conversion with the result that high efficiency in the wavelength conversion can be achieved.

In the invention it is preferable that the input and output sides of the non-linear optical crystal is tilted at a Brewster angle with respect to the optical propagation axis.

This allows one of polarized components of the fundamental laser light to be passed through the input and output sides of the non-linear optical crystal without loss, thus increasing the fines value in the resonator. Also, the input and output sides need not to be covered with anti-reflective coatings, thus reducing the overall cost of production.

In the invention it is preferable that the optical resonator is a folded resonator in which the incident direction is consistent with the reflecting direction on the reflecting means.

According to the invention, the optical resonator includes a minimum number of reflecting means, thus increasing the fines value and providing a high rate of the conversion efficiency.

In the invention it is preferable that the optical resonator is a ring resonator in which the incident direction is not consistent with the reflecting direction on the reflecting means.

According to the invention, the optical resonator includes a minimum number of reflecting means, thus increasing the fines value and providing a high rate of the conversion efficiency.

In the invention it is preferable that the optical resonator is a ring resonator which has a first optical propagation axis extending across the non-linear optical crystal and a second optical propagation axis extending not across the same, both the axes are provided between the first and second reflecting means.

According to the invention, the ring resonator comprises only two reflecting means, hence increasing the finnes value and providing a high rate of the conversion efficiency.

In the invention, it is preferable that the optical resonator is a ring resonator in which the fundamental laser light is incident at an oblique angle to input and output sides of the non-linear optical crystal so as to correct its astigmatism.

According to the invention, the fundamental laser light obliquely enters the input and output side of the non-linear optical crystal, thus minimizing the astigmatism of the laser light, and obtaining an optimum convergence condition of the laser light in the non-linear optical crystal.

In the invention it is preferable that the non-linear optical crystal is of $C_sL_iB_6O_{10}$ (cesium lithium borate).

According to the invention, the wavelength conversion will be conducted at high rate of efficiency.

In the invention it is preferable that the non-linear optical crystal is of BBO (beta-barium borate).

According to the invention, the wavelength conversion will be conducted at high rate of efficiency.

The principle of the present invention is explained below in more detail.

Figure 1:
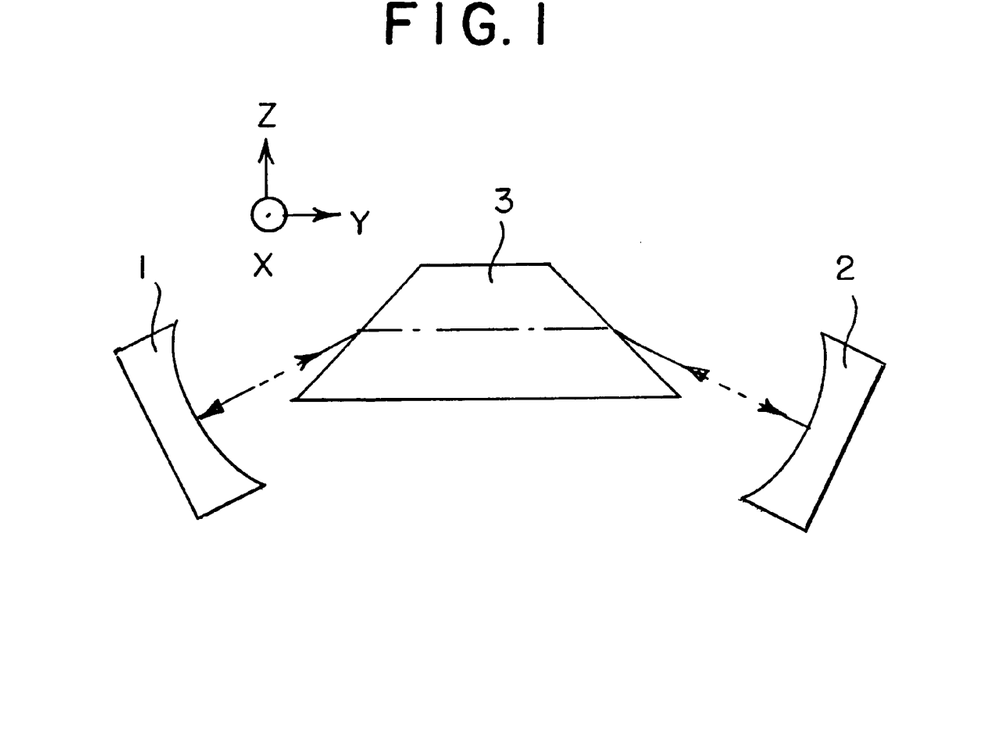
FIG. 1 is a configuration view of a folded resonator.

FIG. 1 is a configuration view of an example of a folded resonator. The folded resonator comprises two reflecting mirrors 1 and 2 arranged in linear relationship and a non-linear optical crystal 3 disposed in the resonator. The non-linear optical crystal 3 is formed in a trapezoid shape so that a pair of input and output sides opposite to each other are tilted with respect to the optical propagation axis. The optical propagation axis is thus refracted at each of the sides. Also, the incident direction is consistent with the reflecting direction on both the reflecting mirrors 1 and 2 to constitute the folded resonator. The fundamental laser light is introduced from an external laser source along the optical propagation axis into the optical resonator.

Such construction allows the control of beam diameter and converging angle on the plane of light incidence (Y-Z plane parallel to the plane of a sheet of FIG. 1) of the laser light traveling along the optical propagation axis when the laser light passes the input and output sides of the non-linear optical crystal 3. For example, the incident plane is made to be consistent with a plane where the acceptance angle of the non-linear optical crystal 3 is limited to a small degree, thus increasing the efficiency of wavelength conversion.

Also, the input and output sides of the non-linear optical crystal is tilted at an oblique angle with respect to the optical propagation axis, thus allowing any reflection at the input and output sides to be deviated from the optical propagation axis and prevented from returning back as a return light to the external laser source, of which function will thus be maintained stable.

Figure 2:
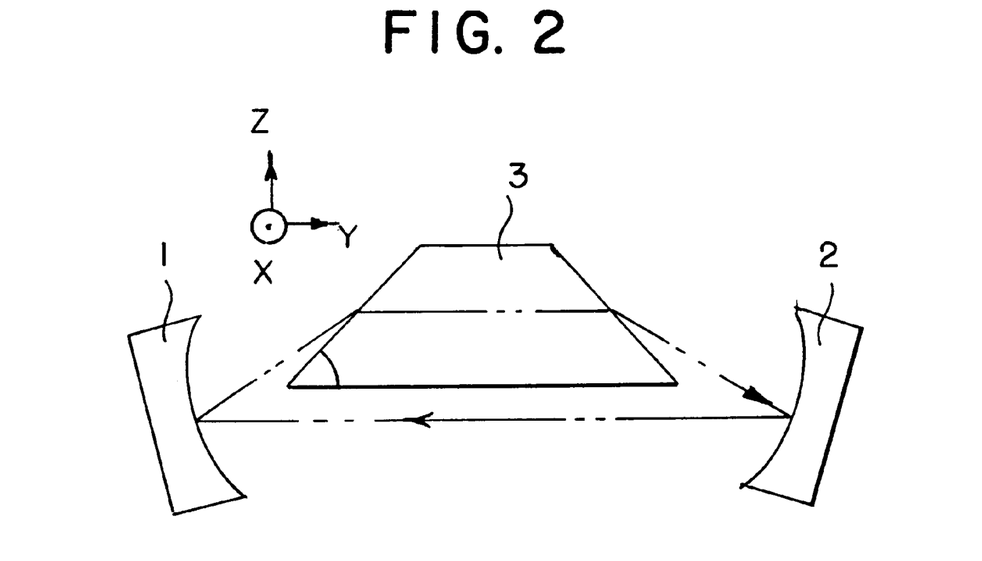
FIG. 2 is a configuration view of a ring resonator.

FIG. 2 is a configuration view showing an example of the ring resonator. The ring resonator comprises two reflecting mirrors 1 and 2 and a non-linear optical crystal 3 disposed in the resonator. Provided between the two reflecting mirrors 1 and 2 are a first optical propagation axis which extends across the non-linear optical crystal 3 and a second optical propagation axis which extends not across the same.

The non-linear optical crystal 3 is formed in a trapezoid shape so that the pair of input and output sides opposite to each other are tilted with respect to the optical propagation axis. The first optical propagation axis of the resonator is thus refracted at each of the sides. The fundamental laser light is introduced from an external laser source along the first or the second optical propagation axis into the optical resonator.

Such construction allows the control of beam diameter and converging angle on the plane of light incidence (Y–Z plane parallel to the plane of a sheet of FIG. 2) of the laser light traveling along the first and second optical propagation axes when the laser light passes the input and output sides of the non-linear optical crystal 3. For example, the incident plane is made to be consistent with a plane where the acceptance angle of the non-linear optical crystal 3 is limited to a small degree, thus increasing the efficiency of wavelength conversion.

Also, the input and output sides of the non-linear optical crystal is tilted at an oblique angle with respect to the first optical propagation axis thus allowing any reflection at the input and output sides to be deviated from the first optical propagation axis and prevented from returning back as a return light to the external laser source, of which function will thus be maintained stable.

As described, the optical resonator is composed of at least the two reflecting mirrors 1 and 2 and the non-linear optical crystal 3 in the form of a minimum number of components having a high fines value, hence contributing to the compact size and the highly efficient wavelength conversion of the apparatus.

Figure 3:
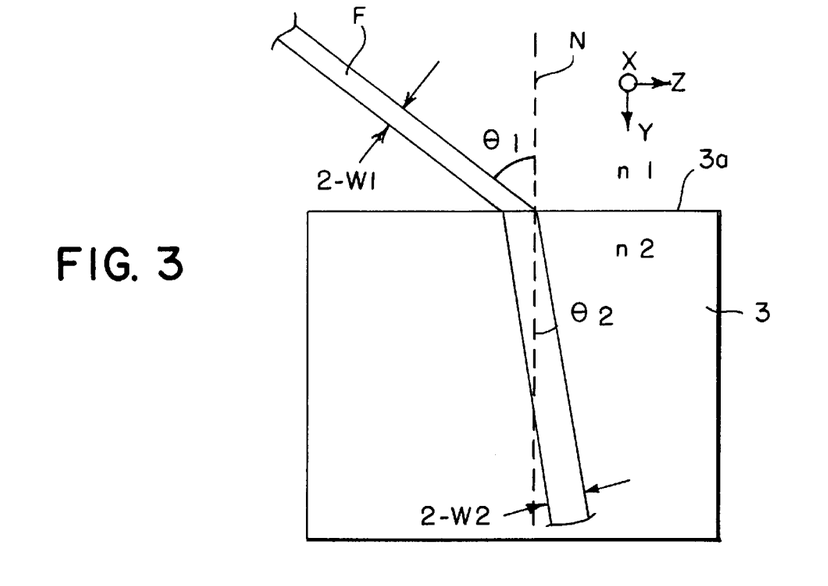
FIG. 3 is an explanatory view showing the refraction of a laser light at a crystal surface.

FIG. 3 is an explanatory view showing refraction of a laser light at the crystal surface. As the fundamental laser light F has entered the surface 3a of the non-linear optical crystal 3 at an incident angle of θ1 to the normal N, it is refracted at a refraction angle of θ2 to the normal N due to the Snell's law.

It is now assumed that the incident plane is defined as the Y–Z plane including the incident direction of the fundamental laser light F and the normal N of the surface 3a of the non-linear optical crystal 2. The refractive index of an opposite medium at the incident side is n1. The refractive index of the non-linear optical crystal 3 is n2. The beam radius of the fundamental laser light F before entering is W1, and the beam radius of the fundamental laser light F after entering is W2. The following equations are established with the beam profile of the laser light F across the surface 3a consistent with the incident plane:

$$n1 \cdot \sin\theta1 = n2 \cdot \sin\theta2 \quad (2)$$

$$2 \cdot W2 = 2 \cdot W1 \cdot (\cos\theta2/\cos\theta1) \quad (3)$$

However, the beam radius on a plane vertical to the incident plane remains unchanged before and after the refraction. The beam radius on the incident plane can thus be varied by tilting the incident laser light.

The above may be achieved when the laser light is a completely collimated light. The actual laser light is regarded due to the effect of diffraction as a Gaussian beam having a beam waist and its profile can precisely be expressed by a ray matrix.

Figure 4:
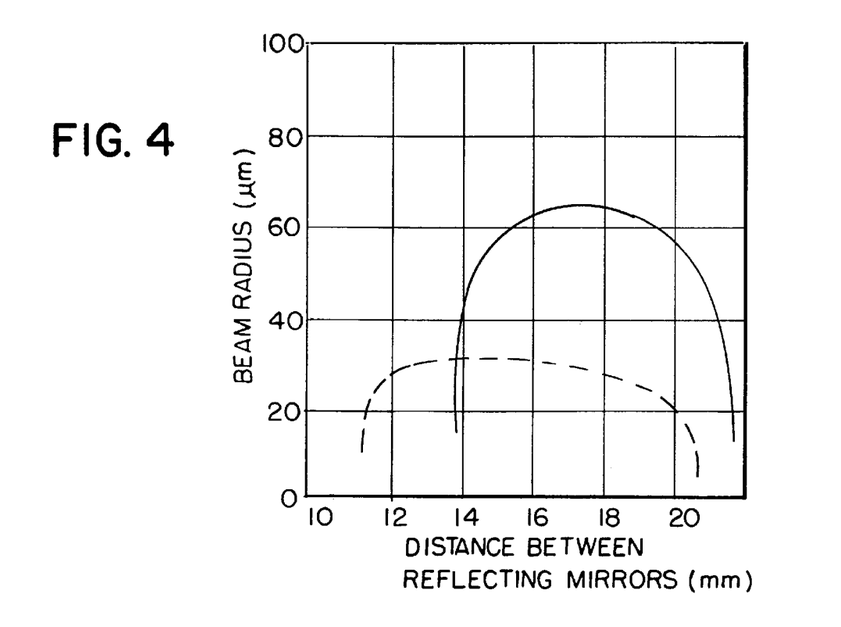
FIG. 4 is a diagram showing calculation results of beam diameter on a non-linear optical crystal in the ring resonator shown in FIG. 2.

FIG. 4 is a diagram showing calculation results of beam radius in the non-linear optical crystal in the ring resonator shown in FIG. 2. The axis of abscissa represents the distance between the two reflecting mirrors 1 and 2 and the axis of ordinate is the beam radius in the center of the crystal, where the non-linear optical crystal 3 is a BBO crystal having a crystalline length of 5 mm, the incident angle θ1 to the non-linear optical crystal 3 is 70 degrees, the curvature radius of the reflecting mirrors 1 and 2 is 10 mm, and the tilting angle of the reflecting mirrors 1 and 2 is 10 degrees. The beam radius on the incident plane (the Y–Z plane) is denoted by the solid line and the beam radius on the vertical plane (the Z–X plane) orthogonal to the incident plane is denoted by the broken line.

The radius is also calculated considering that the effective curvature radius is different between the Y–Z plane and the Z–X plane due to tilting of the reflecting mirrors 1 and 2, thus causing astigmatism which varies the resonator conditions and beam radius between the Y–Z and Z–X planes.

As apparent from FIG. 4, the beam radius on the Y–Z plane falls about 60 μm and about 30 μm on the Z–X plane. The former is almost two times greater than the latter. Hence, the converging angle on the Y–Z plane can be reduced to nearly half according to the equation (1) as compared with that on the Z–X plane.

As the incident plane is arranged substantially parallel to the direction where the acceptance angle for phase matching in the non-linear optical crystal is minimized, most of the fundamental laser light F can be contributed to wavelength conversion, thus increasing the efficiency of the conversion.

In addition, the input and output sides of the non-linear optical crystal are covered with anti-reflective coatings, thus minimizing the optical loss. The input and output sides are tilted at a Brewster angle with respect to the optical propagation axis, hence suppressing the optical loss without coatings. Particularly, it is desired that when the acceptance angles of the non-linear optical crystal in the two directions orthogonal to each other are different, the polarization direction for providing non-reflective refraction at the Brewster angle is consistent with the direction where the acceptance angle is minimized. It is also preferable that the BBO crystal is provided with the anti-reflective coatings since its polarization direction of the fundamental laser light is not consistent with the direction where the acceptance angle is minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

First Embodiment

Figure 5:
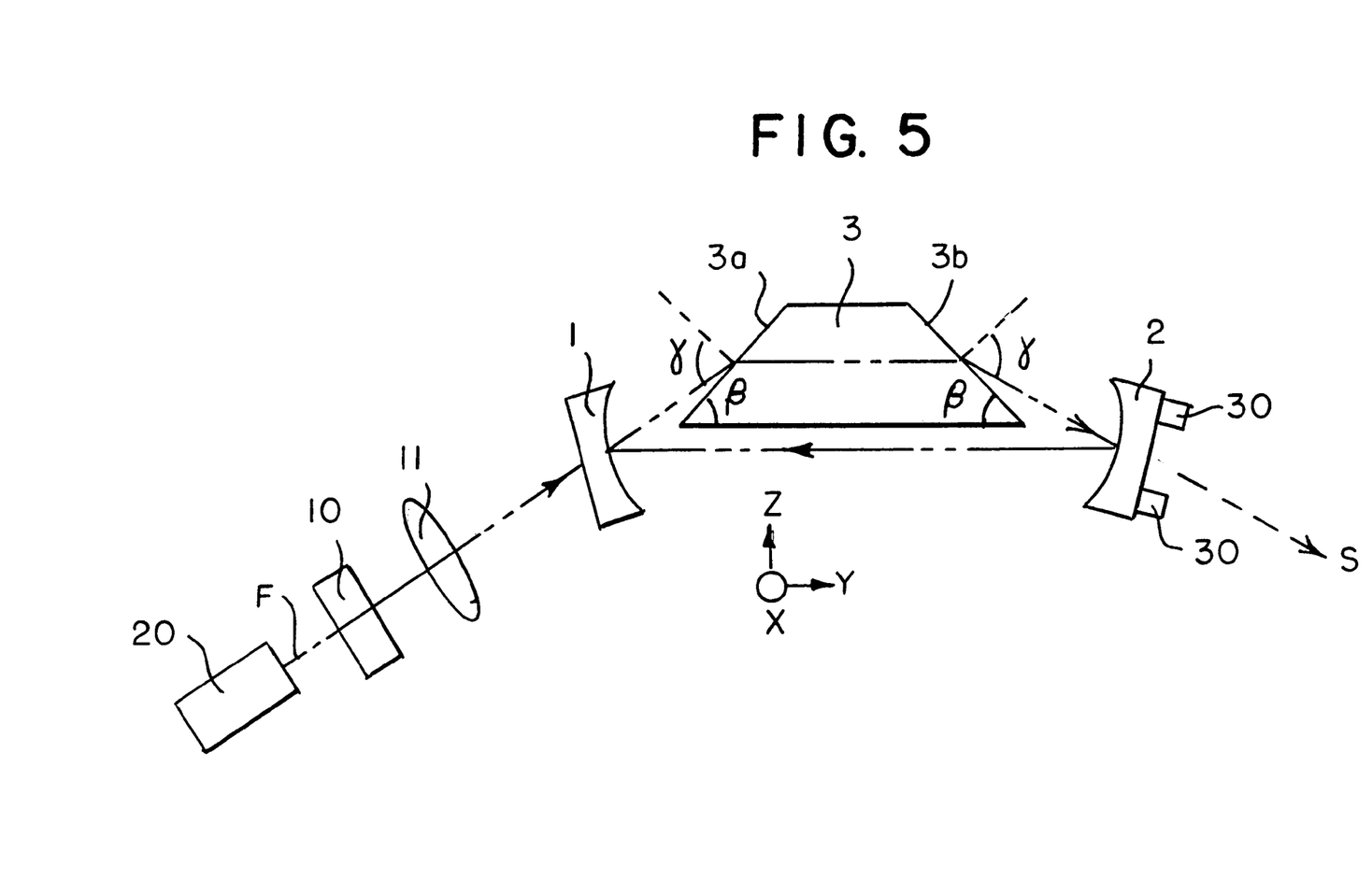
FIG. 5 is a configuration view of a first embodiment of the present invention.

FIG. 5 is a configuration view showing a first embodiment of the present invention. In this embodiment, an example will be described in which green laser light of 532 nm in wavelength is introduced to a ring external resonance type SHG, where it is converted to laser light of 266 nm in wavelength in the ultraviolet spectrum.

A laser light generating apparatus of this embodiment comprises an optical resonator composed of two reflecting mirrors 1 and 2 and a non-linear optical crystal 3 disposed in the optical resonator. A first optical propagation axis which extends through the non-linear optical crystal 3 and a second optical propagation axis which is passed of f the non-linear optical crystal 3 are provided between the two reflecting mirrors 1 and 2.

The non-linear optical crystal 3 is formed into a trapezoid shape having a pair of light input and output sides 3a and 3b tilted with respect to the first optical propagation axis. When the non-linear optical crystal 3 is a BBO crystal, the crystal which is cut so that the direction where $\theta$=47.43 degrees and $\phi$=90 degrees in the form of polar coordinates with respect to the c-axis of the crystal is consistent with the optical propagation axis (the first optical propagation axis) is arranged so that the $\theta$ direction exists within the plane of a sheet of FIG. 5 (the Y–Z plane).

The non-linear optical crystal 3 is cut and optically polished so that the top and bottom sides of the crystal 3 are parallel to the first optical propagation axis and the bottom angle $\beta$ between the bottom side and the input and output sides 3a, 3b is $\beta$=58 degrees. The crystal 3 is oriented so that the incident angle $\gamma$ on the input and output sides 3a, 3b is $\gamma$=70 degrees. The input and output sides 3a, 3b are covered with anti-reflective coatings to pass all the components of 532 nm in wavelength at incident angle $\gamma$=70 degrees. Also, the non-linear optical crystal 3 is arranged movable upward and downward (along the Z-axis direction) for arbitrarily varying the optical path length in the resonator.

The non-linear optical crystal 3 is disposed on a temperature control device (not shown) such as a Peltier device for providing phase matching by thermal control.

The reflecting mirrors 1 and 2 are concave mirrors having a curvature radius of 10 mm. The reflecting mirror 1 is covered on both sides with coatings of reflectivity of 99.0% at 532 nm in wavelength of a fundamental laser light F. Similarly, the reflecting mirror 2 is covered on both sides with coatings of reflectivity of 99.99% at 532 nm in wavelength and transmittance of 85% at 266 nm in wavelength. The reflecting mirror 1 for introducing the fundamental laser light F is arranged lower in the reflectivity than the reflecting mirror 2 in order to provide optical impedance matching in the resonator for optimum wavelength conversion.

An external laser 20 is composed of an internal resonance type SHG including a laser medium of Nd:YV0$_4$ crystal and a potassium tinanyl phosphate (KTP, KTiOPO$_4$) which serves as the non-linear optical device. The external laser 20 emits the fundamental laser light F with 532 nm in wavelength and 100 mW in power.

The fundamental laser light F is passed through a half-wave plate 10 and its polarization direction is vertical to the sheet plane (the X-axis direction). The fundamental laser light F is then converged by a converging lens 11 to a desired pattern such as shown in FIG. 2 and introduced through the reflecting mirror 1 along the first optical propagation axis into the optical resonator.

The fundamental laser light F introduced into the optical resonator is repeatedly reflected between the two reflecting mirrors 1 and 2 and resonated, to be converted to a second harmonic of 266 nm in wavelength by the non-linear optical crystal 3. Disposed behind the reflecting mirror 2 is an actuator 30, e.g. a piezoelectric device, for precisely controlling the location of the reflecting mirror 2 to align the resonant frequency of the optical resonator with the longitudinal mode frequency of the fundamental laser light F, thus giving a higher level of the optical resonance.

As the fundamental laser light F falls obliquely on the input and output sides 3a, 3b of the non-linear optical crystal 3, its converging angle on the incident plane of the non-linear optical crystal 3 is small. Also, the incident plane is consistent with a direction where a smaller degree of the acceptance angle is established, whereby most components of the fundamental laser light F can be converted in wavelength.

The second harmonic laser light S from the non-linear optical crystal 3 is passed through the reflecting mirror 2 and further supplied to the outside.

It is proved in the first embodiment that the far-field pattern of the second harmonic laser light S has approximately a round shape and its output intensity is substantially doubled as compared with the conventional apparatus.

Second Embodiment

Figure 6:
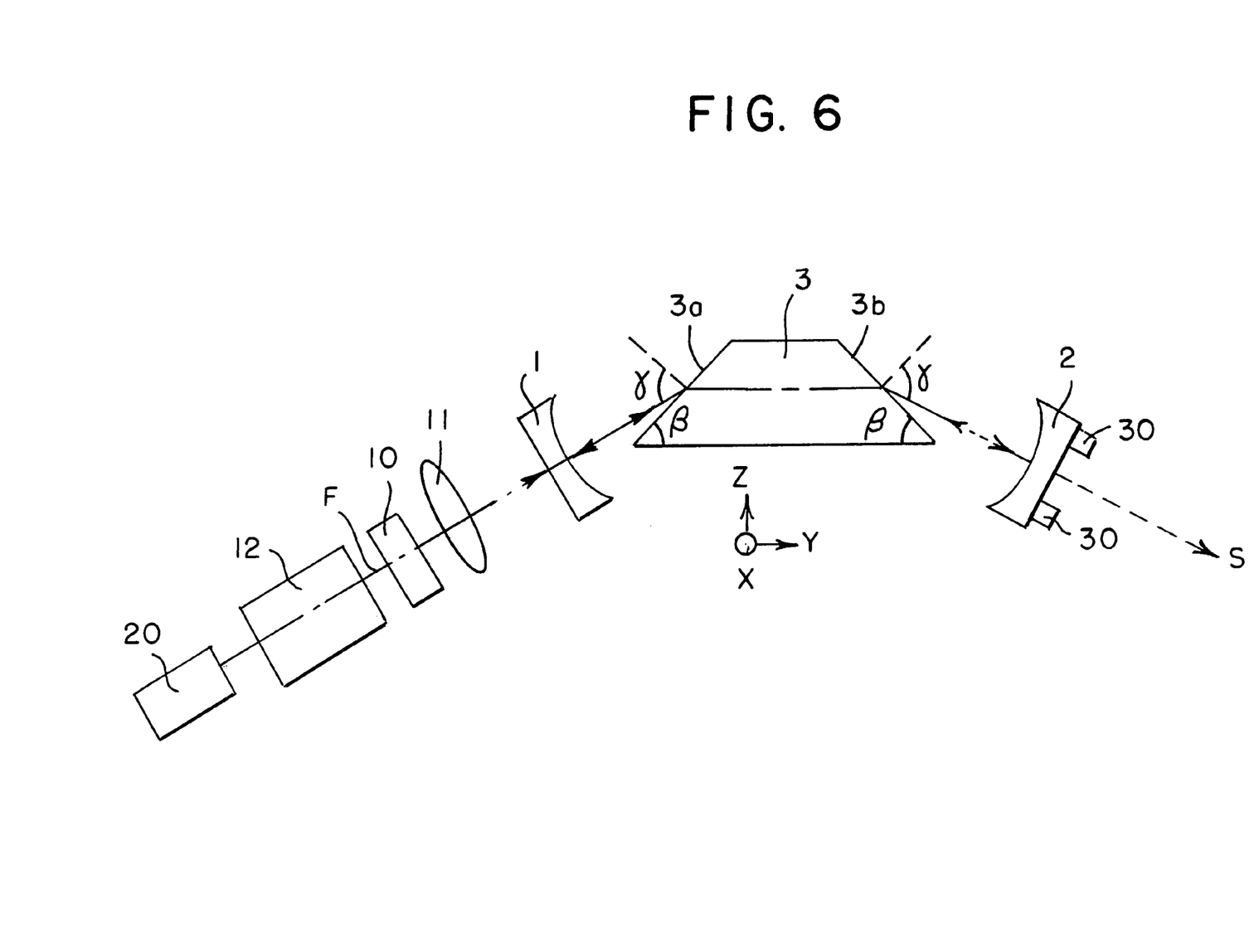
FIG. 6 is a configuration view showing a second embodiment of the present invention.

FIG. 6 is a configuration view of a second embodiment of the present invention. In this embodiment, green laser light of 532 nm in wavelength is introduced into a linear external resonance type SHG for producing laser light which has a wavelength of 266 nm in the ultraviolet spectrum.

The laser light generating apparatus of the second embodiment includes a folded-type optical resonator comprising a pair of reflecting mirrors 1 and 2 and a non-linear optical crystal 3 disposed in the optical resonator. A single optical propagation axis is provided between the two reflecting mirrors 1 and 2. The convergence of a fundamental laser light F in the non-linear optical crystal 3 is adjusted as described with FIG. 1. The folded resonator may produce and direct return light coaxially to an external laser 20. For compensation, an optical isolator 12 is provided for cutting off the return light and preventing mode jumping of the external laser 20. The other components and arrangement are similar to those shown in FIG. 5 and will be explained in no more detail.

It is also proved in the second embodiment that the second harmonic laser light S converted from the fundamental laser light F by the non-linear optical crystal 3 has a far-field pattern which is more round than the conventional one and its output intensity is substantially doubled.

Third Embodiment

Figure 7:
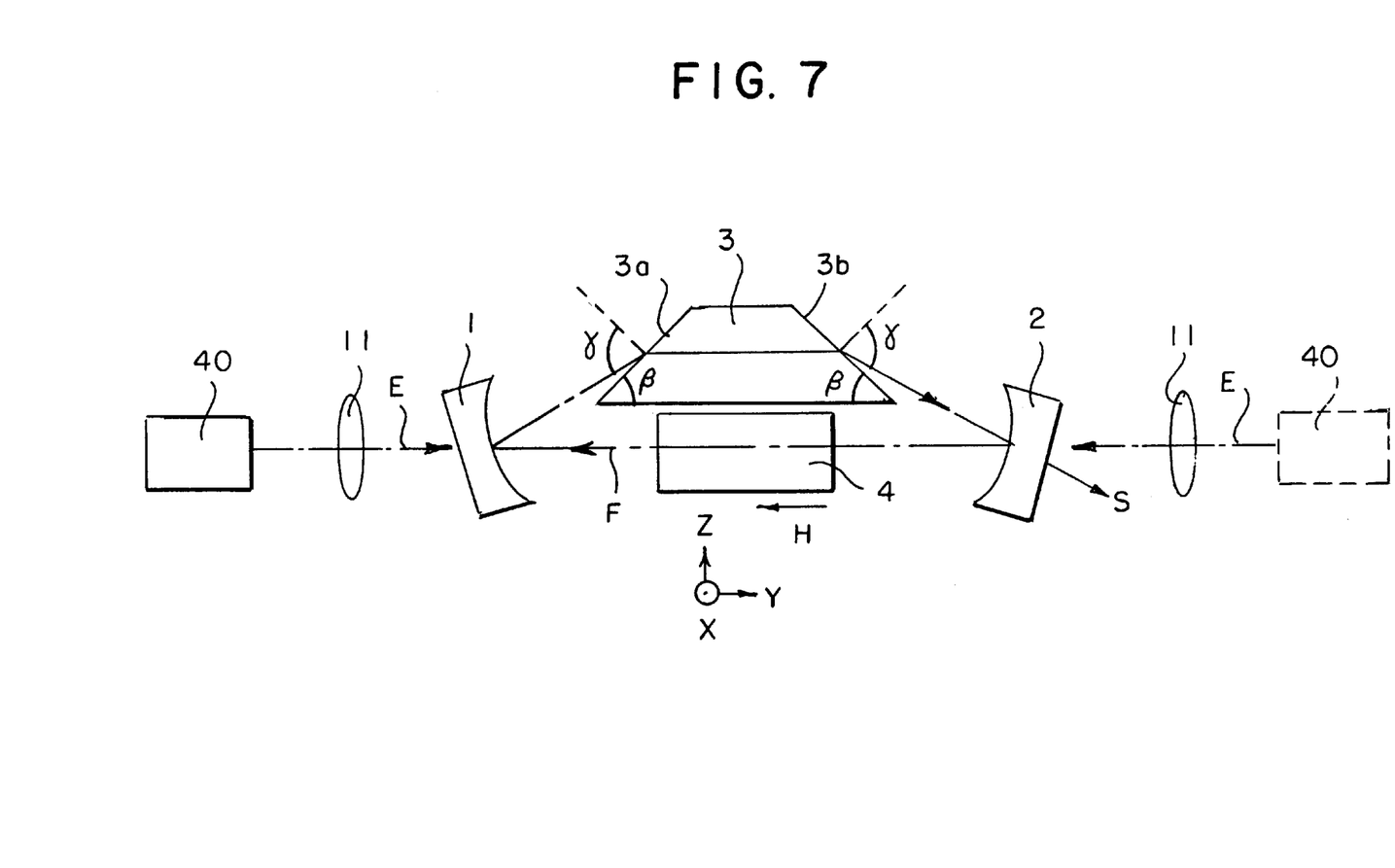
FIG. 7 is a configuration view showing a third embodiment of the present invention.

FIG. 7 is a configuration view showing a third embodiment of the present invention. In this embodiment, exciting light of 809 nm in wavelength is introduced into a ring internal resonance type SHG for producing fundamental laser light which has a wavelength of 1064 nm and green laser light of 532 nm in wavelength is converted from the fundamental laser light. In particular, one of the optical crystal for generating a green laser light is a KTP crystal, which may cause a damage such as gray tracking as its output increases. On the contrary, the BBO crystal rarely cause gray tracking and is high in the resistance to injury. The BBO crystal is however unpractical since it has a large beam walk-off angle and when its input and output sides are vertical to the optical propagation axis in such a conventional arrangement, the profile of output becomes an undesired oval shape. This embodiment is intended to use a crystal like the BBO crystal which has a high resistance to injury and provide an operative degree of angular phase matching.

Referring to FIG. 7, the laser light generating apparatus of the third embodiment includes a ring-type optical resonator comprising a pair of reflecting mirrors 1 and 2 and a combination of a non-linear optical crystal 3 and a laser medium 4 disposed in the resonator. There are provided between the two reflecting mirrors 1 and 2 a couple of first and second optical axes through the non-linear optical crystal 3 and the laser medium 4 respectively.

The non-linear optical crystal 3 is formed of a trapezoid shape having a pair of light input and output sides 3a and 3b tilted with respect to the first optical propagation axis. When the non-linear optical crystal 3 is a BBO crystal, the crystal which is cut so that the direction where $\theta=28.8$ degrees and $\phi=90$ degrees in the form of polar coordinates with respect to the c-axis of the crystal is consistent with the optical propagation axis (the first optical propagation axis) is arranged so that the $\theta$ direction exists within the plane of a sheet of FIG. 7 (the Y–Z plane).

The non-linear optical crystal 3 is cut and optically polished so that the top and bottom sides of the crystal 3 are parallel to the first optical propagation axis and the bottom angle $\beta$ between the bottom side and the input and output sides 3a, 3b is $\beta=58$ degrees. The crystal 3 is oriented so that the incident angle y on the input and output sides 3a, 3b is $\gamma=70$ degrees. The input and output sides 3a, 3b are covered with anti-reflective coatings to pass all the components of 1064 nm in wavelength at incident angle $\gamma=70$ degrees. Also, the non-linear optical crystal 3 is arranged movable upward and downward (along the Z-axis direction) for arbitrarily varying the optical path length in the resonator.

The non-linear optical crystal 3 is disposed on a temperature control device (not shown) such as a Peltier device for providing phase matching by thermal control.

The laser medium 4 is formed of a Nd:YAG crystal doped with 1% of Nd and its light input and output sides are vertical to the optical axis. In addition, a magnetic field generator (not shown), e.g. a permanent magnet, is provided for applying to the laser medium 4 a magnetic field H which is parallel to the second optical propagation axis. The magnetic field H cause one-way resonance in the ring resonator.

The reflecting mirrors 1 and 2 are concave mirrors having a curvature radius of 20 mm. Each of the reflecting mirrors 1 and 2 is covered on both sides with coatings of transmittance of 95.0% at 810 nm in wavelength of exciting light, reflectivity of 99.9% at 1064 nm in wavelength of fundamental laser light F, and transmittance of 95% at 532 nm in wavelength of second harmonic laser light S.

A semiconductor laser 40 for generating the exciting light E of 810 nm in wavelength to excite the laser medium 4 is provided outside the optical resonator. The exciting light E is introduced into the optical resonator with its optical propagation axis consistent with the second optical propagation axis. The semiconductor laser 40 may be located at one end of an extension of the second optical propagation axis, or may be provided at both ends of the second optical propagation axis in order to increase the intensity of the exciting light E supplied to the laser medium 4. A convergence lens 11 for higher convergence of the exciting light E in the laser medium 4 is also provided in the downstream of the semiconductor laser 40.

The operation will now be explained. The exciting light E emitted from the semiconductor laser 40 is passed through the reflecting mirror 1 and introduced into the optical resonator to enter the laser medium 4. The laser medium 4 is excited by the exciting light E to produce a gain. As the result, the fundamental laser light F is generated between the two reflecting mirrors 1 and 2 of the ring resonator. At the time, only one-way resonance (clockwise in FIG. 7) is permitted by the magnetic field over the laser medium 4.

As the fundamental laser light F has been intensified in the optical resonator, it is converted by the non-linear optical crystal 3 to the second harmonic laser light S, which is then released out from the reflecting mirror 2.

Accordingly, it is proved in the third embodiment that the far-field pattern of the green laser light has a more round shape than that of the conventional apparatus in which the input and output sides of the crystal are vertical to the optical propagation axis, thus increasing the intensity of output. In addition, the apparatus employs such a BBO crystal as having a high resistance to injury hence improving the durability and reliability and will be used as a short-wavelength laser source having a longer life.

Although a BBO crystal which has two opposite sides sloped obliquely is used as the non-linear optical crystal 3 throughout the prescribed embodiments, any other non-linear crystal such as $C_sL_iB_6O_{10}$ (cesium lithium borate, CLBO) may be utilized with equal success.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A laser light generating apparatus comprising:
    an optical resonator having at least a pair of reflecting means; and
    a non-linear optical crystal disposed in the optical resonator, the apparatus for introducing fundamental laser light to the optical resonator to cause a resonance action of the fundamental laser light to produce laser light whose wavelength is converted by the non-linear optical crystal, wherein the non-linear optical crystal has a pair of input and output sides which are arranged opposite to and not parallel to each other and also, tilted with respect to an optical propagation axis, the fundamental laser light incident in the non-linear optical crystal being set so that a beam waist is formed to have an oval shaped cross section and that a plane including the incident direction of the fundamental laser light and the direction of the normal to the input and output sides of the non-linear optical crystal and a direction, where the acceptance angle for phase matching in the non-linear optical crystal is small, are substantially parallel.

2. A laser light generating apparatus comprising:
    an optical resonator having at least a pair of reflecting means and a combination of a non-linear optical crystal; and
    a laser medium disposed in the optical resonator, the apparatus for introducing exciting light for exciting the laser medium from outside to the optical resonator to generate fundamental laser light in the optical resonator by the laser medium, and further generate laser light whose wavelength is converted by the non-linear optical crystal, wherein the non-linear optical crystal has a pair of input and output sides which are arranged opposite to and not parallel to each other and tilted with respect to the optical propagation axis, the fundamental laser light incident in the non-linear optical crystal being set so that a beam waist is formed to have an oval shaped cross section and that a plane including the incident direction of the fundamental laser light and the direction of the normal to the input and output sides of the non-linear optical crystal and a direction, where the acceptance angle for phase matching in the non-linear optical crystal is small, are substantially parallel.

3. The laser light generating apparatus of claim 1 or 2 wherein the fundamental laser light is a linearly polarized light which is polarized normally to the plane including the incident direction of the fundamental laser light and the direction of the normal to input and output sides of the non-linear optical crystal.

4. The laser light generating apparatus of any one of claims 1 through 2, wherein the optical resonator is a folded resonator in which the incident direction is consistent with the reflecting direction on the reflecting means.

5. The laser light generating apparatus of any one of claims 1 through 2, wherein the optical resonator is a ring resonator in which the incident direction is not consistent with the reflecting direction on the reflecting means.

6. The laser light generating apparatus of claims 5, wherein the optical resonator is a ring resonator in which the fundamental laser light is incident at an oblique angle to input and output sides of the non-linear optical crystal so as to correct its astigmatism.

7. The laser light generating means of any one of claims 1 through 2, wherein the optical resonator is a ring resonator which has a first optical propagation axis extending across the non-linear optical crystal and a second optical propagation axis extending not across the same, both the axes are provided between the first and second reflecting means.

8. The laser light generating apparatus of claim 7, wherein the optical resonator is a ring resonator in which the fundamental laser light is incident at an oblique angle to input the output sides of the non-linear optical crystal so as to correct its astigmatism.

9. The laser light generating apparatus of any one of claims 1 or 2, wherein the non-linear optical crystal is of $C_5L_1B_6O_{10}$ (cesium lithium borate).

10. The laser light generating apparatus of any one of claims 1 or 2, wherein the non-linear optical crystal is of BBO (beta-barium borate).

* * * * *